(12) United States Patent
Pancotti

(10) Patent No.: US 6,666,407 B2
(45) Date of Patent: Dec. 23, 2003

(54) HELICOPTER UNDERCARRIAGE

(75) Inventor: Santino Pancotti, Gallarate (IT)

(73) Assignee: Agusta S.p.A. (IT)

( * ) Notice: Subject to any disclaimer, the term of this patent is extended or adjusted under 35 U.S.C. 154(b) by 0 days.

(21) Appl. No.: 10/304,910

(22) Filed: Nov. 26, 2002

(65) Prior Publication Data

US 2003/0122034 A1 Jul. 3, 2003

(30) Foreign Application Priority Data

Nov. 30, 2001 (IT) ...................................... TO2001A1121

(51) Int. Cl.⁷ ............................................... B64C 25/14
(52) U.S. Cl. ............................ 244/102 R; 244/103 R
(58) Field of Search .................... 244/103 R, 100 R, 244/102 R, 102 A

(56) References Cited

U.S. PATENT DOCUMENTS

| | | | | |
|---|---|---|---|---|
| 2,630,989 A | * | 3/1953 | Sikorsky | |
| 2,843,345 A | * | 7/1958 | Sikorsky | |
| 2,909,342 A | * | 10/1959 | Maltby | |
| 2,967,033 A | * | 1/1961 | Langdon | |
| 3,384,331 A | * | 5/1968 | Palmer | |
| 4,228,975 A | * | 10/1980 | Sealey | |
| 4,422,603 A | | 12/1983 | Turiot et al. | |
| 5,337,976 A | | 8/1994 | Derrien | |

* cited by examiner

Primary Examiner—Tien Dinh
(74) Attorney, Agent, or Firm—Akerman Senterfitt

(57) ABSTRACT

An undercarriage for a helicopter, having a supporting structure connectable to the fuselage of the helicopter, a wheel suspended from the supporting structure, and a shock absorbing member which has a bottom end portion hinged to the wheel, and is interposed, in use, between the wheel and the fuselage. The supporting structure has an attachment fixable to the fuselage, and a first and a second beam having first connecting portions hinged about a first axis to each other and to a top end portion of the shock absorbing member. Second connecting portions are connected to separate portions of the attachment in articulated manner and lower down with respect to the first connecting portions.

13 Claims, 5 Drawing Sheets

HELICOPTER UNDERCARRIAGE

The present invention relates to a helicopter undercarriage, in particular a main undercarriage.

BACKGROUND OF THE INVENTION

As is known, helicopters normally feature a nose undercarriage, and two main undercarriages on either side of the fuselage. An important function of the undercarriages is to absorb the downward energy of the helicopter when landing, so, depending on the conditions in which they are expected to operate, undercarriages may differ widely in type.

For example, military helicopters normally feature nonretractable undercarriages designed to strict specifications governing resistance to crash landings, and which normally comprise a supporting lever mechanism connected to the fuselage and from which one or more wheels are suspended; and a shock absorbing member connected at opposite ends to the wheel and a relative side of the fuselage, and for absorbing the downward energy of the helicopter. More specifically, the supporting lever mechanism—often defined by a single arm hinged to the supporting structure of the helicopter—keeps the relative wheel at a given distance from the underside of the fuselage, and, when landing, allows vertical travel of the wheel under control of the shock absorbing member.

Civilian helicopters, on the other hand, which are designed to less stringent crash resistance specifications than military types, normally feature retractable undercarriages, i.e. with wheels that, during flight, can be withdrawn or stowed within the body of the helicopter to reduce drag. In this case, the lever mechanisms supporting the wheels of the undercarriages are normally designed to permit a first rotation of the wheels towards the fuselage in their vertical planes, and a second rotation, in vertical planes perpendicular to the former, to stow the wheels horizontally inside the wheel housings. More specifically, retractable undercarriages normally comprise a housing structure which is fixed to and projects from the fuselage, carries the supporting lever mechanism from which the relative wheel is suspended, and defines the housing for the wheel in the stowed position.

The difference in the way retractable and nonretractable undercarriages interface with the fuselage is the main obstacle preventing the same fuselage being used for both civilian and military helicopters. And, since a fuselage currently takes about two years to complete, this means production can only be commenced upon receipt of the purchase order, thus seriously delaying delivery of the finished helicopter.

SUMMARY OF THE INVENTION

It is an object of the present invention to provide a helicopter undercarriage which meets the crash resistance specifications governing military helicopters, and at the same time provides a straightforward, low-cost solution to the aforementioned drawback.

According to the present invention, there is provided an undercarriage for a helicopter, comprising a supporting structure connectable to a fuselage of the helicopter; at least one wheel suspended from said supporting structure; and at least one shock absorbing member which has a first end portion hinged to said wheel, and is interposed, in use, between the wheel and said fuselage; characterized in that said supporting structure comprises an attachment fixable to said fuselage; and a first and a second beam having first connecting portions hinged about a first axis to each other and to a second end portion of said shock absorbing member, and second connecting portions connected to separate portions of said attachment in articulated manner and lower down with respect to said first connecting portions.

BRIEF DESCRIPTION OF THE DRAWINGS

Two preferred, non-limiting embodiments of the present invention will be described by way of example with reference to the accompanying drawings, in which.

DETAILED DESCRIPTION OF THE INVENTION

Figure 1:
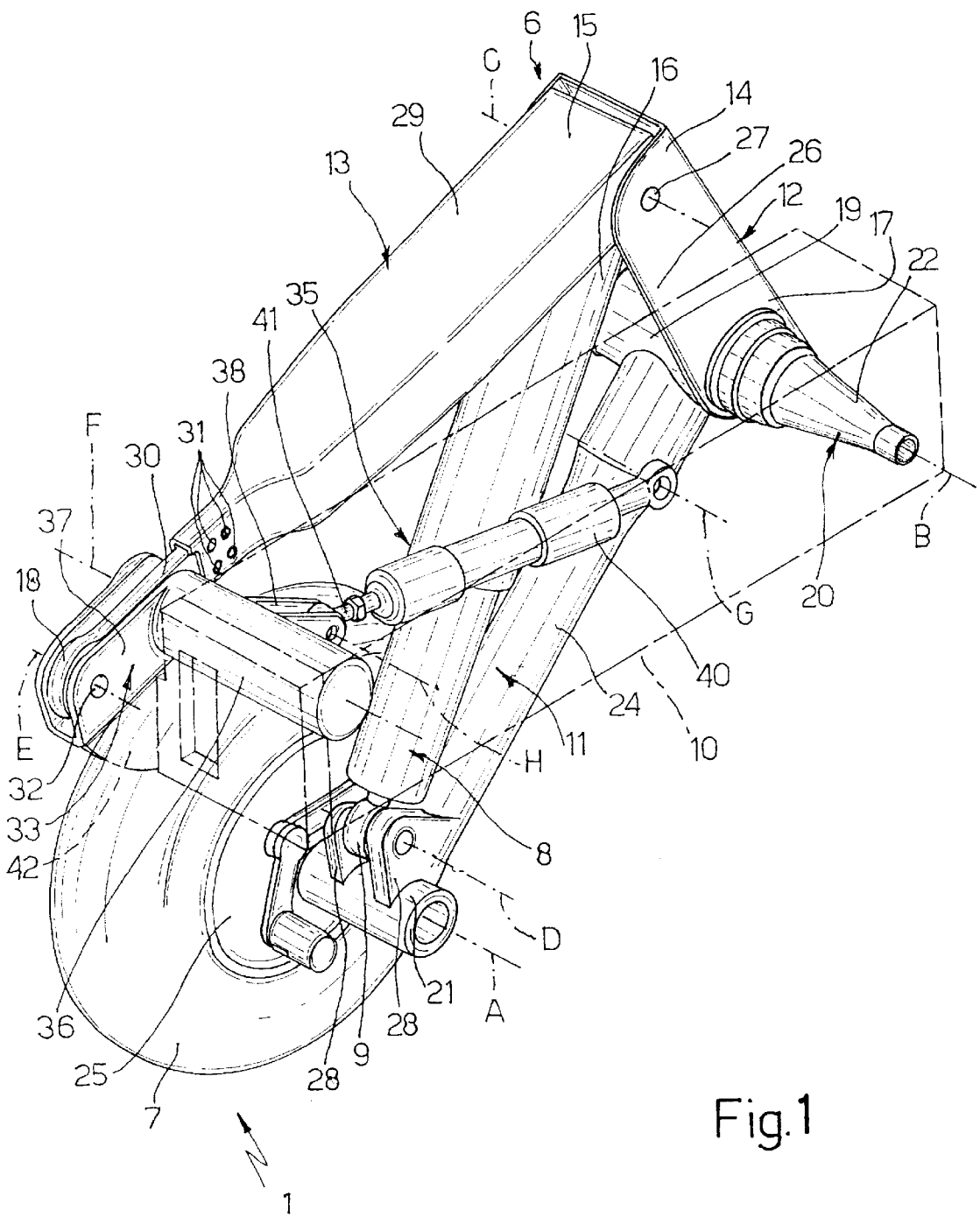
FIG. 1 shows a view in perspective of a semiretractable helicopter undercarriage in accordance with the teachings of the present invention and in an extended configuration.
Figure 2:
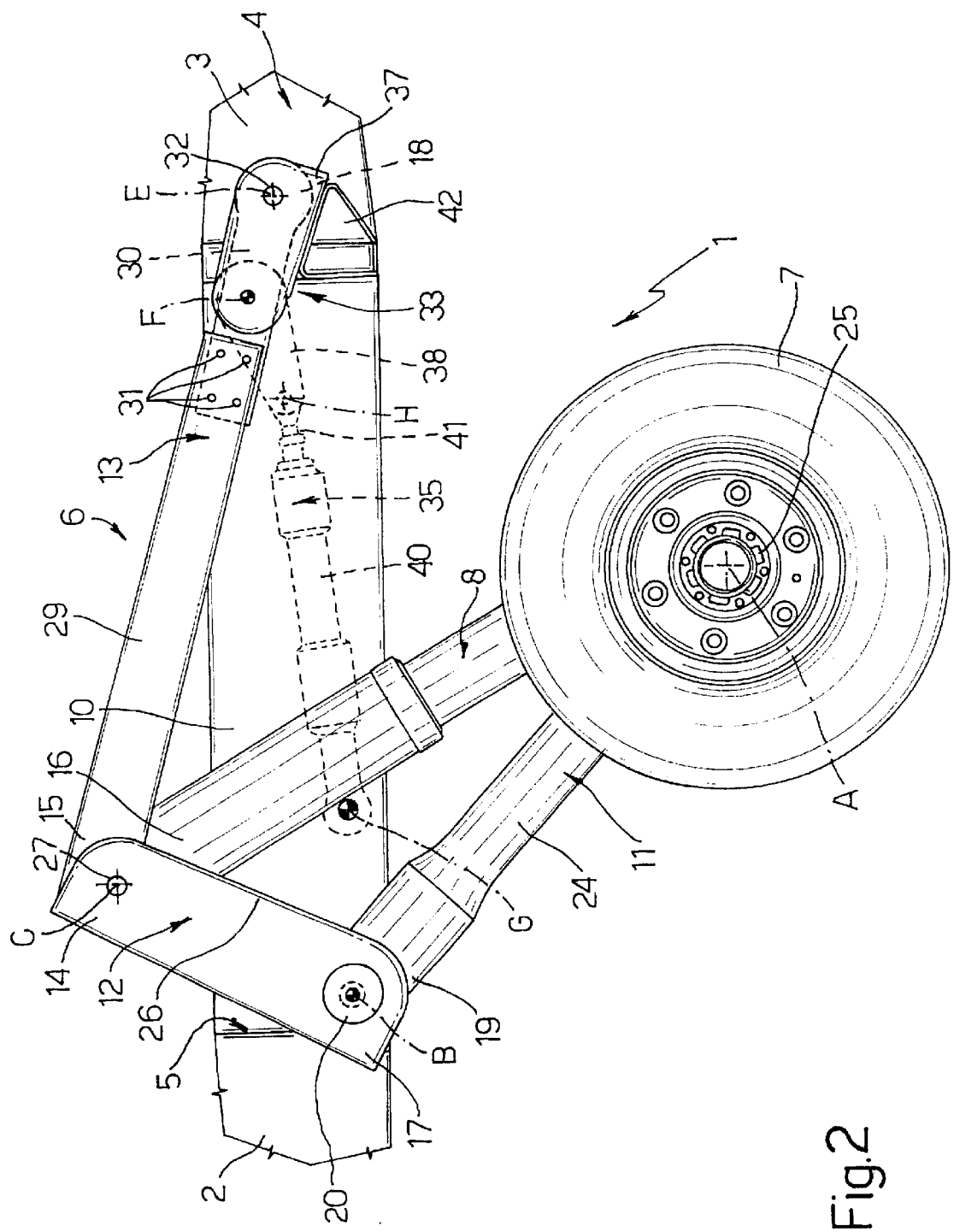
FIG. 2 shows a side view of the FIG. 1 undercarriage fitted to the helicopter fuselage.

In FIGS. 1 to 4, number 1 indicates as a whole a helicopter semiretractable main undercarriage, particularly suitable for military helicopters.

The helicopter itself being known, only the components necessary for a clear understanding of the present invention are shown, i.e. two bulkheads 2, 3 forming part of a fuselage 4 and defining a bottom lateral seat 5 for receiving undercarriage 1.

As shown in FIGS. 1 to 4, undercarriage 1 substantially comprises a supporting structure 6 connectable to fuselage 4 of the helicopter; a wheel 7, of axis A, suspended from supporting structure 6; and a known shock absorbing member 8, which has a bottom end portion 9 hinged to wheel 7, and is interposed, in use, between wheel 7 and fuselage 4.

An important aspect of the present invention lies in supporting structure 6 comprising an attachment 10 fitted rigidly inside seat 5 of fuselage 4, between bulkheads 2 and 3; an arm 11 supporting wheel 7 and hinged to attachment 10, adjacent to bulkhead 2; and two beams 12, 13 having first end portions 14, 15 hinged to each other and to a top end portion 16 of shock absorbing member 8, and second end portions 17, 18 connected to attachment 10 in articulated manner and lower down with respect to end portions 14, 15.

More specifically, attachment 10 is in the form of a hollow parallelepiped and is elongated in the moving direction of the helicopter.

One end 19 of arm 11 is hinged to attachment 10 about a pin 20 having an axis B parallel to axis A, and wheel 7 is fitted to and projects from the opposite end 21.

More specifically (FIGS. 1 and 4), pin 20 comprises a truncated-cone-shaped portion 22 connected rigidly to attachment 10; and a cylindrical portion 23 projecting outwards from attachment 10 and supporting for rotation end 19 of arm 11 and end portion 17 of beam 12. More specifically, arm 11 and beam 12 extend on opposite sides of pin 20.

Arm 11 is substantially cylindrical and perpendicular to axes A and B along a trunk 24, and is cylindrical and coaxial with axes A and B at ends 19 and 21.

End 19 is fitted in rotary manner to cylindrical portion 23 of pin 20, and end 21 is fixed to and projects from a hub 25 of wheel 7.

Figure 4:
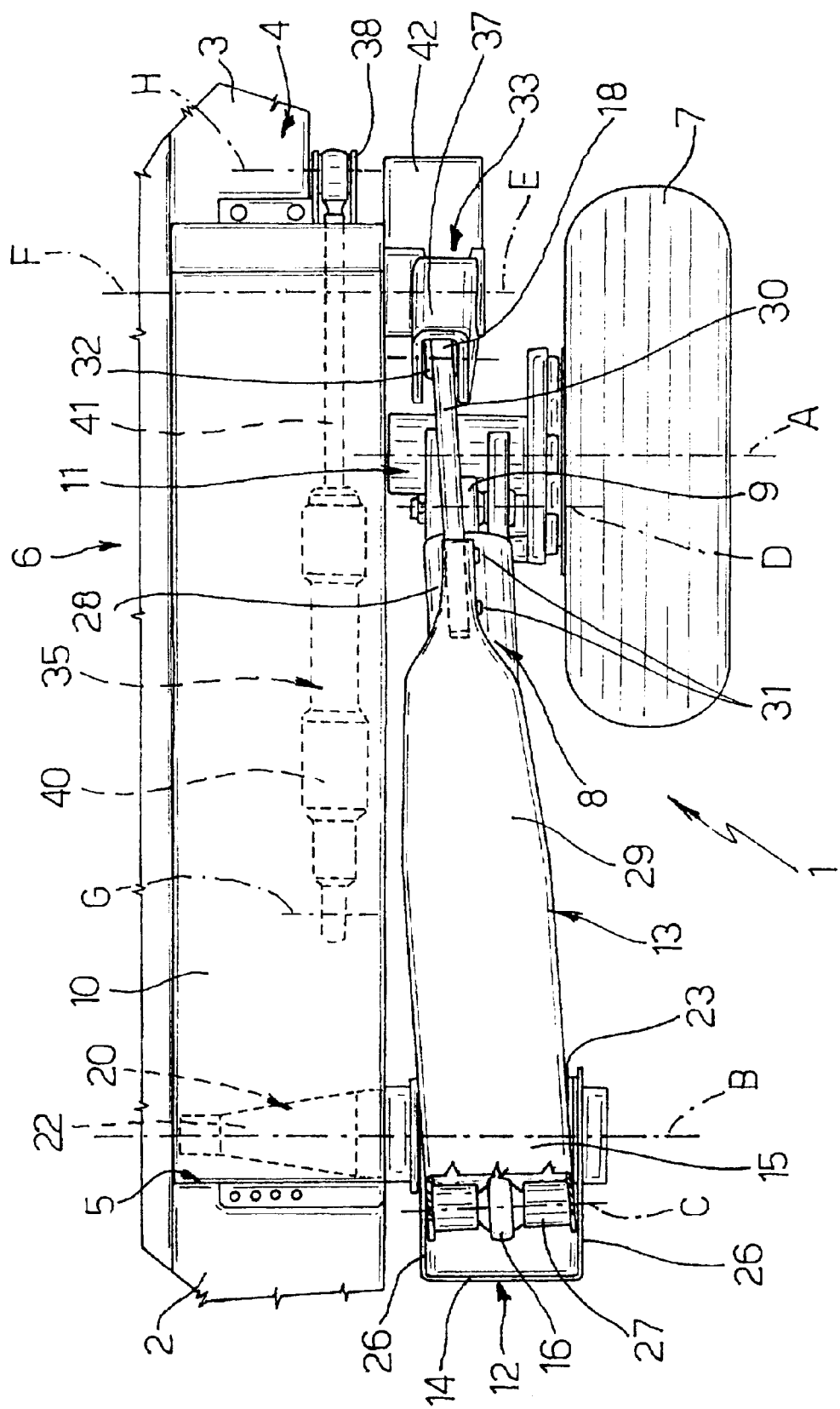
FIG. 4 shows a top plan view of the FIG. 3 undercarriage.

Beam 12 has a U-shaped section, and comprises two parallel lateral edges 26 fitted through with pin 20 at end portion 17 and supporting, at opposite end portion 14, a pin 27 having an axis C parallel to axes A and B, and to which are hinged end portions 15 and 16 of beam 13 and shock absorbing member 8 (FIG. 4).

The bottom end portion 9 of shock absorbing member 8 is hinged about an axis D, parallel to axes A, B and C, between two lugs 28 (FIGS. 1 and 4) projecting from end 21 of arm 11.

As shown in FIGS. 1 to 4, beam 13 comprises two telescopically connected members 29, 30, which define end portions 15, 18 respectively, and are fixed in the desired relative position by a number of screws 31.

More specifically, member 29 is in the form of a parallelepiped-shaped box, is hinged at one end to pin 27, and partly houses member 30 at the opposite end.

More specifically, member 29 is engaged between lateral edges 26 of beam 12, and tapers towards an open end from which member 30 projects; and member 30 is in the form of a plate of limited thickness, in a direction parallel to axes A, B, C, D, with respect to its other dimensions (FIGS. 1 and 4).

Figure 3:
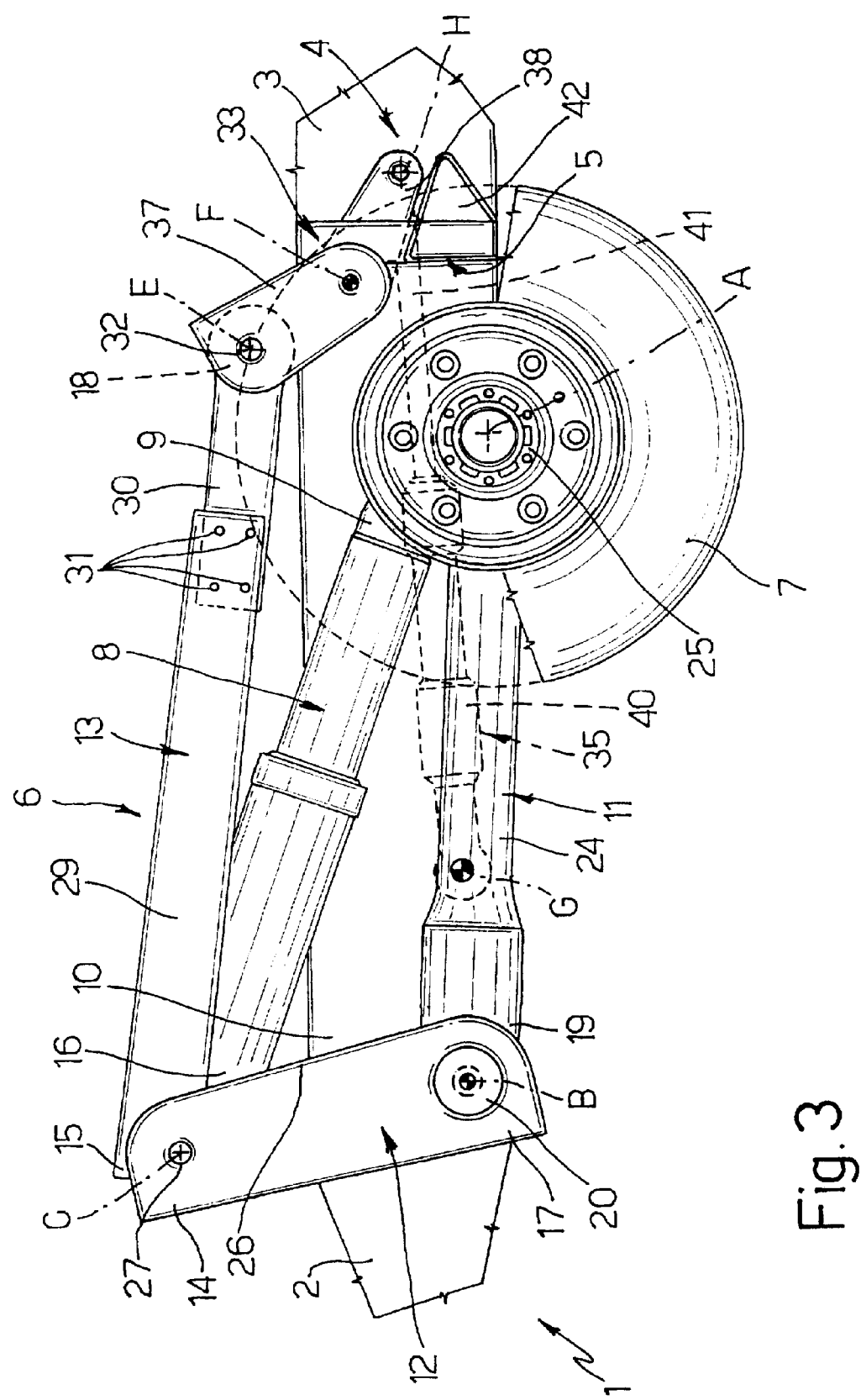
FIG. 3 shows a side view of the FIG. 2 undercarriage in a withdrawn configuration.

End portion 18, defined by member 30, of beam 13 is advantageously hinged, about a pin 32 of axis E parallel to axes A, B, C, D, to a crank member 33, which in turn is hinged to attachment 10 about an axis F parallel to axis E, and is activated by a known hydraulic jack 35 to move wheel 7 between an extracted landing position (FIGS. 1 and 2) and a withdrawn or stowed position (FIGS. 3 and 4).

More specifically, crank member 33 comprises a cylindrical intermediate portion 36, of axis F, extending through and connected in rotary manner to attachment 10; a first lug 37 projecting radially from intermediate portion 36, and having a free end hinged by pin 32 to end portion 18 of beam 13; and a second lug 38 projecting radially from intermediate portion 36, forming an obtuse angle of less than 180° with lug 37, and hinged to jack 35.

Lug 37 projects from an axial end of intermediate portion 36 projecting from attachment 10, and is U-shaped to engage and house end portion 18 of beam 13.

Jack 35 and lug 38 are preferably housed inside attachment 10. More specifically, jack 35 comprises a jacket 40 elongated substantially in the maximum-extension direction of attachment 10, and having one end hinged to attachment 10 about an axis G parallel and adjacent to axis B; and a rod 41, which is housed and slides inside jacket 40, projects from the opposite end of jacket 40, and is hinged to lug 38 of crank member 33 about an axis H parallel to axis G.

More specifically, jack 35 is movable between two, respectively fully withdrawn (FIGS. 1 and 2) and fully extended (FIGS. 3 and 4), operating configurations corresponding to respective minimum- and maximum-extraction operating positions of rod 41 with respect to jacket 40.

By virtue of the movement of rod 41 between said operating positions, undercarriage 1 is movable between an extended configuration (FIGS. 1 and 2) in which wheel 7 is maintained in the extracted position, and a withdrawn configuration (FIGS. 3 and 4) in which wheel 7 is maintained in the stowed position.

In the extended configuration of undercarriage 1, corresponding to the fully withdrawn configuration of jack 35, lug 37 of crank member 33 rests on an appendix 42 projecting from attachment 10 on the bulkhead 3 side, and is engaged along its whole length by member 30 of beam 13; movable axes C and E are located on opposite sides of fixed axis F; and shock absorbing member 8 and arm 11 extend obliquely downwards from respective hinge pins 27, 20 to keep wheel 7 in the extracted landing position at a predetermined distance from attachment 10.

In the extended configuration of undercarriage 1, fixed axis F is advantageously located slightly higher than the line joining axes C and E, so as to avoid subjecting jack 35 to bending stress.

In the withdrawn configuration of undercarriage 1, corresponding to the fully extended configuration of jack 35, lug 37 of crank member 33 is rotated towards beam 12 with respect to the extended configuration, so that axis E moves closer to fixed axis B, axis C moves away from fixed axis F, and wheel 7 moves up into the stowed position in which a top angular portion of the wheel faces attachment 10, and a bottom angular portion of the wheel projects from attachment 10. In the withdrawn configuration of undercarriage 1, axes C and F are located on opposite sides of axis E.

Undercarriage 1, in short, constitutes a preassembled unit fixable to seat 5 of fuselage 4, between bulkheads 2 and 3.

In actual use, undercarriage 1 switches from the extended to the withdrawn configuration as described below, when jack 35 is moved from the fully withdrawn to the fully extended configuration.

More specifically, as rod 41 slides gradually out of jacket 40 of jack 35, lug 38 is rotated about axis F, together with the whole of crank member 33. As a result, lug 37 rotates towards beam 12 and, by exerting thrust on beam 13, moves beam 13 towards bulkhead 2, so that movable axis E moves closer to fixed axis B, and movable axis C moves away from fixed axis F. The angle between beams 12 and 13 closes gradually, and wheel 7, suspended from arm 11 and shock absorbing member 8, moves up towards bulkhead 3 so that its top portion faces attachment 10. More specifically, at this stage, shock absorbing member 8, whose length does not vary, rotates together with pin 27 about axis B to produce a similar rotation of wheel 7, which moves up towards attachment 10.

When undercarriage 1 is fitted to a military helicopter, in which case, crash resistance requirements are only met in the extended configuration of undercarriage 1, the switch from one configuration to the other may be governed automatically by an altitude sensor or radar, thus reducing in-flight drag of the helicopter as compared with conventional military helicopters featuring, as stated in the introduction, fixed undercarriages.

Figure 5:
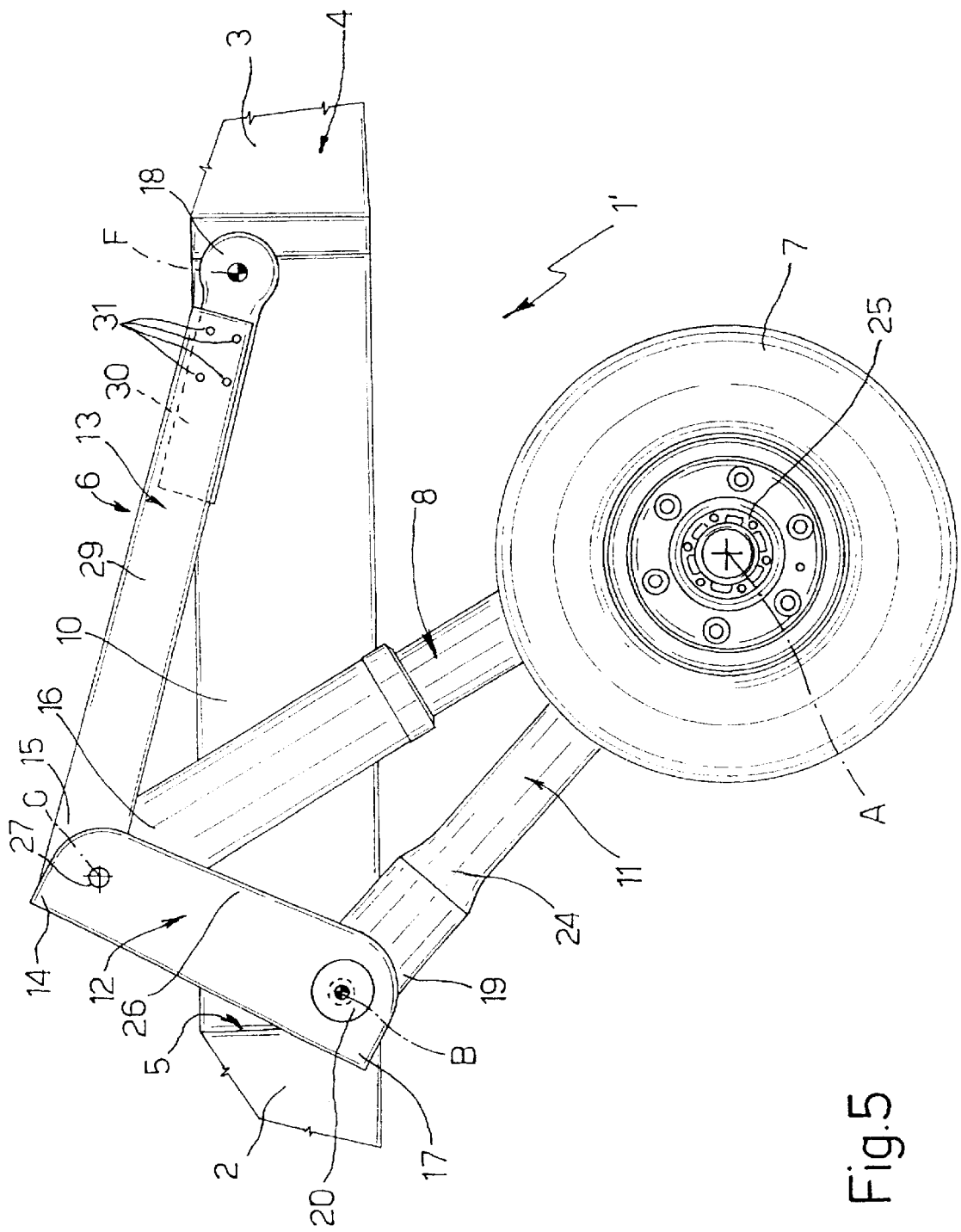
FIG. 5 shows a side view of a nonretractable helicopter undercarriage in accordance with the teachings of the present invention.

Number 1' in FIG. 5 indicates as a whole a fixed helicopter undercarriage in accordance with the teachings of the present invention, and the component parts of which are indicated, where possible, using the same reference numbers as for the corresponding or equivalent parts already described with reference to undercarriage 1.

More specifically, undercarriage 1' can be obtained from undercarriage 1 by simply eliminating jack 35 and crank member 33, and by hinging end portion 18 of beam 13 directly to attachment 10 about axis F. The resulting reduction in the length of beam 13 can easily be compensated by repositioning members 29 and 30: in the example shown, member 30 is slid inside member 29 to the desired length, and then fixed to member 29 by screws 31.

In this case, too, undercarriage 1' constitutes a preassembled unit fixable inside seat 5 of fuselage 4, between bulkheads 2 and 3.

The advantages of undercarriages 1, 1' according to the present invention will be clear from the foregoing description.

In particular, by connecting shock absorbing member 8 directly to the hinge point between beams 12 and 13, in turn connected to attachment 10 lower down with respect to said common hinge point, supporting structure 6, while allowing shock absorbing member 8 sufficient travel to meet strict requirements governing the crash resistance of military helicopters, is extremely compact and enables the construction of a preassembled undercarriage (1, 1') interfaceable with the fuselage in exactly the same way as a retractable civilian helicopter undercarriage.

The undercarriages according to the present invention therefore enable the same fuselage to be used for both military and civilian helicopters, thus enabling considerable scale economy and reducing the delivery time of the finished helicopter, by fuselage fabrication being independent of the type, i.e. military or civilian, purchase order.

Moreover, as shown, the undercarriage described provides for switching quickly and easily from a semiretractable (1) to a fixed (1') undercarriage solution, by simply eliminating jack 35 and crank member 33 and hinging end portion 18 of beam 13 directly to attachment 10.

Clearly, changes may be made to undercarriages 1, 1' as described and illustrated herein without, however, departing from the scope of the accompanying claims.

What is claimed is:

1. An undercarriage for a helicopter, comprising:
   a supporting structure connectable to a fuselage of the helicopter;
   at least one wheel suspended from said supporting structure; and
   at least one shock absorbing member which has a first end portion hinged to said wheel, and is interposed, in use, between the wheel and said fuselage;
   wherein said supporting structure comprises an attachment fixable to said fuselage; and
   a first and a second beam having first connecting portions hinged about a first axis to each other and to a second end portion of said shock absorbing member, and second connecting portions connected to separate portions of said attachment in articulated manner and lower down with respect to said first connecting portions.

2. An undercarriage as claimed in claim 1, wherein said supporting structure comprises a supporting arm having a first end portion connected to said wheel, and an opposite second end portion hinged to said attachment.

3. An undercarriage as claimed in claim 1, wherein said second connecting portions of said first and said second beam are hinged to said attachment respectively about a second and a third axis, both fixed and parallel to said first axis.

4. An undercarriage as claimed in claim 1, wherein said second connecting portion of said first beam is hinged to said attachment about a fixed second axis parallel to said first axis; and wherein said second connecting portion of said second beam is hinged to a crank member to permit movement of said wheel between an extracted landing position and a stowed in-flight position.

5. An undercarriage as claimed in claim 4, wherein said crank member is hinged to said attachment about a fixed third axis parallel to said first and said second axis, and to said second connecting portion of said second beam about a fourth axis parallel to said first, said second, and said third axis; said undercarriage comprising actuating means acting on said crank member to vary the distance between said first axis and the fixed said third axis, and between said fourth axis and the fixed said second axis, so as to move said wheel up and down between said extracted and stowed positions.

6. An undercarriage as claimed in claim 3, wherein said second and said third axis are located at opposite lateral ends of said attachment.

7. An undercarriage as claimed in claim 5, wherein, in said extracted position of said wheel, said third axis is located higher with respect to a line joining said first and said fourth axis.

8. An undercarriage as claimed in claim 2, wherein said second end portion of said supporting arm is hinged to said attachment about said second axis.

9. An undercarriage as claimed in claim 5, wherein said attachment is box-shaped; and in that at least said actuating means and part of said crank member are housed in said attachment.

10. An undercarriage as claimed in claim 5, wherein said actuating means comprise a jack having one end hinged to said attachment, and an opposite end hinged to said crank member.

11. An undercarriage as claimed in claim 5, wherein said crank member comprises an intermediate portion connected to said attachment to rotate about said third axis; a first lug projecting from said intermediate portion radially with respect to said third axis, and having a free end hinged to said second connecting portion of said second beam; and a second lug projecting from said intermediate portion radially with respect to said third axis, and connected to said actuating means.

12. An undercarriage as claimed in claim 1, wherein said second beam comprises two telescopically connected members respectively defining said first and said second connecting portion of the second beam, and fixed in the desired relative position by releasable fastening means.

13. An undercarriage as claimed in claim 1, wherein said shock absorbing member, said wheel, and said supporting structure define a preassembled unit fixable to a receiving section of said fuselage.

* * * * *